(12) United States Patent
Bergström et al.

(10) Patent No.: US 12,007,074 B2
(45) Date of Patent: Jun. 11, 2024

(54) MOBILE FLUID SUPPLY SYSTEM, A METHOD FOR SUPPLYING FLUID, A CONTROL UNIT AND A VEHICLE, VESSEL OR CRAFT COMPRISING THE MOBILE FLUID SUPPLY SYSTEM

(71) Applicant: Volvo Construction Equipment AB, Eskilstuna (SE)

(72) Inventors: Johanna Bergström, Gothenburg (SE); Roland Kvist, Braås (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/990,781

(22) Filed: Nov. 21, 2022

(65) Prior Publication Data
US 2023/0194052 A1 Jun. 22, 2023

(30) Foreign Application Priority Data
Dec. 20, 2021 (EP) .................................... 21216058

(51) Int. Cl.
*F17C 7/00* (2006.01)
*B60R 16/08* (2006.01)
(Continued)

(52) U.S. Cl.
CPC .............. *F17C 7/00* (2013.01); *B60R 16/08* (2013.01); *H01M 8/04089* (2013.01);
(Continued)

(58) Field of Classification Search
CPC ........................ F17C 7/00; F17C 2221/012; F17C 2223/036; F17C 2227/0157;
(Continued)

(56) References Cited

U.S. PATENT DOCUMENTS 5,673,735 A * 10/1997 Crvelin ................ F17C 13/045
141/54
8,069,885 B2 * 12/2011 Kederer ................ F17C 5/007
62/48.1
(Continued)

FOREIGN PATENT DOCUMENTS

DE 19653731 A1 8/1998

*Primary Examiner* — Timothy P. Kelly
*Assistant Examiner* — Stephanie A Shrieves
(74) *Attorney, Agent, or Firm* — Sage Patent Group (57) ABSTRACT

The disclosure relates to an electrically powered mobile fluid supply system (MFSS) for supplying fluid to a host unit. The MFSS comprises at least one pressurized fluid volume, a fluid dispenser fluidly connectable to the host unit and configured to supply fluid from the at least one pressurized fluid volume to the host unit in a fluid supply operation, and at least one compressor configured to build sufficient pressure for the fluid supply operation in the MFSS. The MFSS is configured to be electrically connected to the host unit and the at least one compressor is configured to be electrically connected to the MFSS and electrically powered by the host unit during the fluid supply operation. The disclosure further relates to a method for supplying fluid to a host unit, to a control unit configured to control the fluid supply operation, and to the MFSS.

13 Claims, 7 Drawing Sheets

(51) Int. Cl.
*H01M 8/04082* (2016.01)
*H01M 8/04089* (2016.01)

(52) U.S. Cl.
CPC ... *H01M 8/04201* (2013.01); *F17C 2221/012* (2013.01); *F17C 2223/036* (2013.01); *F17C 2227/0157* (2013.01); *F17C 2227/0337* (2013.01); *F17C 2250/032* (2013.01); *F17C 2270/01* (2013.01); *H01M 2250/20* (2013.01)

(58) Field of Classification Search
CPC ........ F17C 2227/0337; F17C 2250/032; F17C 2270/01; F17C 2265/063; F17C 2265/065; H01M 8/040489; F17D 1/04; Y02E 60/32
USPC .......................................................... 141/11
See application file for complete search history.

(56) References Cited

U.S. PATENT DOCUMENTS

| | | | |
|---|---|---|---|
| 8,461,804 B1* | 6/2013 | Capizzo | B60L 53/66 320/109 |
| 10,317,011 B2* | 6/2019 | Okuno | F17C 5/007 |
| 11,073,242 B2* | 7/2021 | Morris | F02C 6/00 |
| 2004/0049982 A1* | 3/2004 | Shimizu | B01J 14/005 48/89 |
| 2004/0187950 A1* | 9/2004 | Cohen | C01B 3/00 141/1 |
| 2006/0156742 A1* | 7/2006 | Farese | F17C 6/00 62/53.2 |
| 2006/0289080 A1* | 12/2006 | Chan | B01D 53/261 141/94 |
| 2013/0032237 A1 | 2/2013 | Adler et al. | |
| 2013/0240080 A1* | 9/2013 | Pick | F17C 5/007 180/69.5 |
| 2014/0102587 A1* | 4/2014 | Nagura | B60L 58/40 141/69 |
| 2015/0240996 A1* | 8/2015 | Kapoor | F17C 13/002 137/565.17 |
| 2018/0355301 A1* | 12/2018 | Loraine | C12M 23/36 |
| 2020/0010966 A1* | 1/2020 | Kazuno | C25B 15/02 |

* cited by examiner

MOBILE FLUID SUPPLY SYSTEM, A METHOD FOR SUPPLYING FLUID, A CONTROL UNIT AND A VEHICLE, VESSEL OR CRAFT COMPRISING THE MOBILE FLUID SUPPLY SYSTEM

CROSS REFERENCE TO RELATED APPLICATIONS

This application claims priority to European Patent Application No. 21216058.4, filed on Dec. 20, 2021, the disclosure and content of which is incorporated by reference herein in its entirety.

TECHNICAL FIELD

The present disclosure relates to an electrically powered mobile fluid supply system, to a method for supplying fluid, to a control unit configured to control the supply of fluid, and to a vehicle, vessel or craft comprising the mobile fluid supply system.

BACKGROUND

Demand for fuel cell-driven vehicles and other fuel cell-powered units is increasing but an established and reliable infrastructure for carrying out refuelling operations is still lacking, which hampers the introduction of fuel cell applications. Mobile fluid supply systems are believed to be able to alleviate some of the problems of an insufficient infrastructure.

However, mobile fluid supply systems are complicated, expensive and large, especially in the field of mobile hydrogen fluid supply systems, such as Mobile Hydrogen Refuelling Stations (MHRS). Two vehicles may be needed for a mobile hydrogen supply system. One vehicle carries a low-pressure hydrogen storage, and another vehicle carries the refueling system itself.

The MHRS is expected to be self-generating when it comes to electric power. The power requirement is further high, in the range of 100 kW-300 kW, or more. A battery electric vehicle (BEV) carrying the fluid supply system is not expected to be able to provide enough power to facilitate a fluid supply operation. A fuel cell electric vehicle (FCEV), carrying the fluid supply system, has enough power but leads to increased complexity and cost of the mobile fluid supply system. Today, the power is generated by a diesel engine or a diesel generator of the MHRS or by connecting the MHRS to the grid.

SUMMARY

Therefore, an object of the disclosure is to remedy at least some of the shortcomings of present mobile fluid supply systems.

According to a first aspect of the disclosure, the object is achieved by an electrically powered mobile fluid supply system for supplying fluid to a host unit according to claim 1. The mobile fluid supply system comprises at least one pressurized fluid volume, a fluid dispenser fluidly connectable to the host unit and configured to supply fluid from the at least one pressurized fluid volume to the host unit in a fluid supply operation, and at least one compressor configured to build sufficient pressure for the fluid supply operation in the mobile fluid supply system. The mobile fluid supply system is configured to be electrically connected to the host unit and the at least one compressor is configured to be electrically connected to the mobile fluid supply system and electrically powered by the host unit during the fluid supply operation.

The at least one pressurized fluid volume may contain a fluid, such as a liquid or a gas, to be transferred to the host unit. The host unit may be a vehicle, such as a car, a truck, a bus or a construction vehicle in need of fluid supply. The host unit may also be a marine vessel, an aircraft or a stationary machine or apparatus. The host unit has a system for supplying, and/or for generating, electric power, such as an electric energy storage system, e.g., at least a battery or a fuel cell or a generator, or an engine capable of supplying electric power.

In terms of the present disclosure a low-pressure fluid volume is a fluid volume at 300 bar (30 MPa) or less. A medium-pressure fluid volume is a fluid volume at a pressure in the range of 300 bar (30 MPa)-700 bar (70 MPa). A high-pressure fluid volume is a fluid volume at a pressure above 700 bar (70 MPa), such as 950 bar (95 MPa). However, pressurized fluid volumes are being developed to be able to contain larger amounts of fluid. In the near future, low-pressure fluid volumes, such as adapted to be towed on a trailer, may be able to contain fluid at a pressure up to 1000 bar (100 MPa).

Also, since the pressure in a fluid volume may change as fluid is evacuated or refilled, a high-pressure, medium-pressure or low-pressure fluid volume is herein defined according to the pressure of the fluid volume when the volume is full, i.e., at the prescribed maximum pressure of the fluid volume/fluid container.

The mobile fluid supply system may be a module transportable by a vehicle, vessel or craft or it may be permanently installed on a vehicle, a vessel or a craft. A transportable module might for instance be deployed in a convenient location of a constructions site, where construction vehicles may go to refuel. Where the mobile fluid supply system is installed on a vehicle, the vehicle may travel to meet up with host units requiring fluid supply, for instance using a fluid supply management system communicating data between host units and the mobile fluid supply system, such as battery status, fluid level, location, time for fluid re-supply. The data may be used for determining an optimal fluid supply schedule and amount for the host unit, and for setting the host in an optimal status for fluid re-supply and to prepare for electrically connecting the mobile fluid supply system with the host unit.

By fluidly connecting the at least one pressurized fluid volume to the host unit via the fluid dispenser, the fluid supply operation may be initiated. The fluid dispenser is fluidly connected, or connectable, to the at least one pressurized fluid volume. The fluid supply operation is further aided by the provision of the at least one compressor, which builds sufficient pressure to make the fluid supply operation efficient.

By electrically connecting the mobile fluid supply system to the host unit to electrically power the fluid supply system during the fluid supply operation, the at least one compressor, and optionally any other consumers of electric power, may be driven by the host unit. In other words, the mobile fluid supply system may be simplified, smaller, and more cost-efficient compared to today's systems. The fluid supply operation may further be carried out in remote locations, where a power grid is lacking. Obviously, the mobile fluid supply system may also be used in the event of power failure in an existing grid.

Optionally, the at least one pressurized fluid volume comprises at least two pressurized fluid volumes, and the at least one compressor may be arranged to alternatingly pressurize each one of the at least two pressurized fluid volumes. The at least two pressurized fluid volumes may be high-pressure fluid volumes.

The provision of at least two pressurized fluid volumes means that when one pressurized fluid volume is used in the fluid supply operation, the compressor may be arranged to pressurize the at least one other pressurized fluid volume such that the at least one other pressurized fluid volume is prepared and made ready for a subsequent fluid supply operation. This enables the mobile fluid supply system to be ready for supplying fluid to a further host unit only a short time after suppling fluid to the first host unit. Thereby, a sequence of multiple fluid supply operations may be carried out more efficiently.

By carrying high-pressure fluid volumes, the mobile fluid supply system may further be able to supply fluid to a limited number of host units without requiring a much larger and cumbersome low-pressure fluid volume. A low-pressure fluid volume may in some cases require a trailer to be towed by the mobile fluid supply system. In other cases, the low-pressure volume may be a stationary volume, such as a fluid tank, available on site of the fluid supply operation, with which the mobile fluid supply system may fluidly connect on arrival at the site.

Optionally, at least one pressurized fluid volume is a medium-pressure fluid volume and the at least one compressor may further comprise a booster compressor fluidly coupled and arranged between the at least one medium-pressure fluid volume and the fluid dispenser.

In case of carrying at least one medium-pressure fluid volume, the booster compressor is capable of pressurizing the fluid supplied from the medium-pressure fluid volume to a higher pressure to more efficiently carry out the fluid supply operation. The booster compressor may thus also be electrically powered by the host unit.

The mobile fluid supply system may further comprise a compressor for pressurizing the at least one medium-pressure fluid volume.

The medium-pressure fluid volume may comprise more fluid as compared to a high-pressure volume but may still be comprised in the mobile fluid supply system without requiring an additional trailer or vehicle.

Optionally, the mobile fluid supply system may further comprise a cooling device arranged between the at least one pressurized fluid volume and the fluid dispenser. The cooling device may be configured to cool fluid being supplied in the fluid supply operation. The cooling device may be electrically connected to the mobile fluid supply system and configured to be electrically powered by the host unit during the fluid supply operation.

A cooling device, such as a heat exchanger, is especially advantageous in case the fluid is hydrogen, which increases in temperature as it expands at ambient temperatures. A hydrogen storage volume in the host unit often comprises heat-sensitive plastic parts, such as lining(s), which may be damaged by temperatures exceeding e.g., 85 degrees C. To efficiently supply fluid/hydrogen to the host unit, a cooling device may be used to cool the fluid/hydrogen before it is dispensed into the storage volume of the host unit. Pre-compressed hydrogen may for instance be cooled to −40 degrees C. by a heat exchanger before dispensing to the host unit. As an example, a host unit supplied with hydrogen may, after the fluid supply operation, have a filled 700-bar (70 MPa) storage volume at 70 degrees C. Without the cooling device, the fluid supply operation could still be carried out, but at a slower rate to avoid reaching damaging temperatures.

Optionally, the mobile fluid supply system may be a mobile hydrogen fueling system and the at least one pressurized fluid volume may be at least one pressurized hydrogen volume.

As a stated above, the present disclosure is especially advantageous for mobile fluid supply systems where the fluid is hydrogen. In other words, the mobile fluid supply system may be a mobile hydrogen supply system, e.g., a mobile hydrogen refueling station (MHRS).

According to a second aspect of the disclosure, the object is achieved by a method for supplying fluid to a host unit from a mobile fluid supply system according to the first aspect. The method comprises fluidly connecting the fluid dispenser to the host unit, electrically connecting the mobile fluid supply system to the host unit, and in a fluid supply operation, supplying fluid to the host unit from the at least one pressurized fluid volume via the fluid dispenser. The fluid supply operation is electrically powered by the host unit.

The fluid supply operation may be carried out without the use of a compressor if the pressure of the pressurized fluid volume is higher than a pressure in a storage volume of the host unit. However, in order to carry out an efficient fluid supply operation, the compressor is used and is electrically powered by the host unit.

Optionally, the fluid supply operation may comprise supplying fluid to the host unit from one of the at least two pressurized fluid volumes, and simultaneously pressurizing the at least one other pressurized fluid volumes using the at least one compressor.

As described above, a sequence of fluid supply operations may be made more efficient if at least two pressurized fluid volumes are comprised in the mobile fluid supply system, where the method comprises pressurizing the at least one fluid volume not being used to supply fluid in the fluid supply operation. The mobile fluid supply system is thereby ready for supplying fluid to a further host unit only a short time after suppling fluid to the first host unit.

Optionally, when at least one pressurized fluid volume is a medium-pressure fluid volume, the fluid supply operation may comprise pressurizing fluid being supplied from the at least one medium-pressure fluid volume to the fluid dispenser using the booster compressor.

A medium-pressure fluid volume may thus be used in the mobile fluid supply system, which allows more fluid to be carried to host units requiring fluid supply.

Optionally, when the mobile fluid supply system comprises a cooling device, the fluid supply operation may further comprise cooling the fluid supplied from the at least one pressurized fluid volume.

According to a third aspect of the disclosure, the object is achieved by a control unit configured to control the fluid supply operation according to the method of the second aspect.

According to a fourth aspect of the disclosure, the object is achieved by a computer program comprising program code to cause the control unit to execute the steps of the fluid supply operation.

According to a fifth aspect of the disclosure, the object is achieved by a computer readable medium having stored thereon the computer program of claim.

The control unit may be connected to a computer readable medium having stored thereon a computer program, which comprises program code to cause the control unit to execute any of the method steps of the fluid supply operation of the present disclosure. The control unit is configured to control the fluid supply operation by controlling the at least one compressor and any further consumers of electric power, such as further compressors and cooling device(s). The control unit will use the software/computer program to control the at least one compressor to start and to stop and may also control which pressurized fluid volume to pressurize when the fluid supply system comprises more than one pressurized fluid volume. Further, the control unit may monitor the temperature of the dispensed fluid control cooling device to adjust the temperature accordingly. One or more temperature sensors may be provided for this purpose, which are communicatively connected to the control unit.

The control unit may further be used in the fluid supply management system, to communicate data between host units and the mobile fluid supply system, and to use the data to determine an optimal fluid supply schedule and amount of fluid needed for the host unit, and for communicating required settings for the host to be in an optimal status for fluid re-supply and to be prepared for electrically connecting the host unit with the mobile fluid supply system.

According to a sixth aspect of the disclosure, a vehicle, vessel or craft comprises the mobile fluid supply system outline above. The mobile fluid supply system may, as outlined hereinabove, be a module transportable by a vehicle, a vessel or a craft. It may also be integrally installed on a vehicle, a vessel or a craft. The mobile fluid supply system may thus be installed on a vehicle such as a truck. It may also be installed on a marine vessel or on an aircraft.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION

The present disclosure is developed in more detail below, referring to the appended drawings which show examples of embodiments. The disclosure should not be viewed as limited to the described examples of embodiments; instead, it is defined by the appended patent claims. Like numbers refer to like elements throughout the description.

Figure 1:
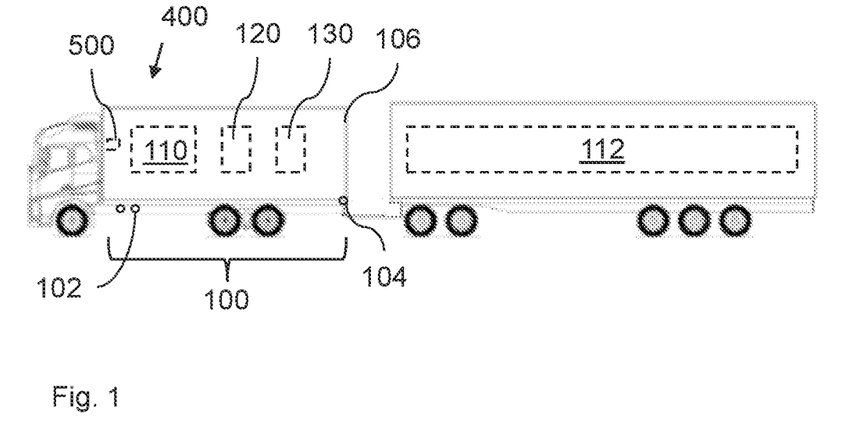
FIG. 1 shows a side view of a vehicle comprising a mobile fluid supply system according to the present disclosure, FIG. 2 schematically shows an example of a mobile fluid supply system according to the present disclosure, FIG. 3 schematically shows an example of an optional configuration of a mobile fluid supply system according to the present disclosure, FIG. 4 schematically shows an example of an optional configuration of a mobile fluid supply system according to the present disclosure, FIG. 5 schematically shows an example of an optional configuration of a mobile fluid supply system according to the present disclosure, FIG. 6 schematically shows an example of an optional configuration of a mobile fluid supply system according to the present disclosure, FIG. 7 schematically shows an example of an optional configuration of a mobile fluid supply system according to the present disclosure.

FIG. 1 illustrates a mobile fluid supply system 100 according to the present disclosure. The mobile fluid supply system 100 may be a module 106 transportable by a vehicle, vessel or craft or it may be permanently installed on a vehicle, a vessel or a craft 400. In FIG. 1, a truck 400 is shown to carry the mobile fluid supply system 100. If using a transportable module 106, it may be in the form of a container or housing, which may be unloaded from the vehicle 400, and which comprises the mobile fluid supply system 100. The transportable module 106 might for instance be deployed in a convenient location of a construction site, where construction vehicles may go to refuel. Where the mobile fluid supply system is permanently installed on a vehicle 400, the vehicle 400 may travel to meet up with host units (not shown in FIG. 1) requiring fluid supply.

The mobile fluid supply system 100 may comprise an electrical connector 102 configured for electrically connecting with the host unit. The mobile fluid supply system 100 may further comprise a fluid connector 104 for fluidly connecting with an auxiliary pressurized fluid volume 112. The auxiliary pressurized fluid volume 112 may be a fluid storage, such as a low-pressure fluid volume. The low-pressure fluid volume may be mobile and may be carried or towed by the vehicle, vessel or craft 400. In FIG. 1, the auxiliary pressurized fluid volume is exemplified as installed on a trailer, towable by the truck 400, which truck 400 carries the mobile fluid supply system 100. The auxiliary pressurized fluid volume 112 may also be stationary, allowing the mobile fluid supply system 100 to dock and to fluidly connect with the auxiliary pressurized fluid volume 112 on site of the auxiliary pressurized fluid volume 112.

Figure 2:
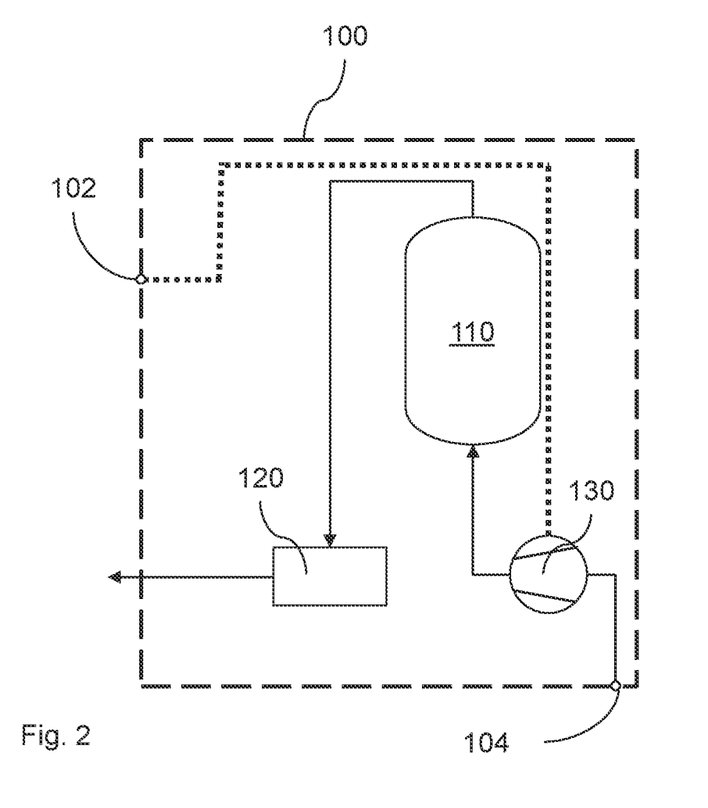

FIG. 2 schematically shows an example of a mobile fluid supply system 100 according to the present disclosure. The mobile fluid supply system 100 comprises at least one pressurized fluid volume 110, a fluid dispenser 120 fluidly connectable to the host unit (not shown in FIG. 2) and configured to supply fluid from the at least one pressurized fluid volume 110 to the host unit in a fluid supply operation. The fluid dispenser 120 may be fluidly connected, or connectable, to the at least one pressurized fluid volume 110. At least one compressor 130 is configured to build sufficient pressure for the fluid supply operation in the mobile fluid supply system 100. The mobile fluid supply system 100 is configured to be electrically connected to the host unit, e.g., via the electrical connector 102. The at least one compressor 130 is configured to be electrically connected to the mobile fluid supply system 100 and electrically powered by the host unit during the fluid supply operation.

It is optional to fluidly connect the mobile fluid supply system 100 to an auxiliary pressurized fluid volume 112, as exemplified in FIG. 1. The at least one pressurized fluid volume 110 may comprise enough fluid for a limited number of fluid supply operations. However, with access to an auxiliary pressurized fluid volume, the number of possible fluid supply operations is increased and the at least one pressurized fluid volume 110 may be kept at the intended pressure and be sooner ready for a subsequent fluid supply operation.

A control unit 500 (FIG. 1) may be comprised in the mobile fluid supply system 100 and configured to control the fluid supply operation. The control unit 500 may be connected to a computer readable medium (not shown) having stored thereon a computer program, which comprises program code to cause the control unit 500 to execute steps of the fluid supply operation described hereinbelow. The control unit 500 is configured to control the fluid supply operation by controlling the at least one compressor 130 and any further consumers of electric power. The control unit 500 may use the software/computer program to control switch on or switch off the at least one compressor 130 and may also control which pressurized fluid volume 110 to pressurize when the fluid supply system 100 comprises more than one pressurized fluid volume 110.

The control unit may further be used in the fluid supply management system, to communicate data between host units and the mobile fluid supply system, and to use the data to determine an optimal fluid supply schedule and amount of fluid needed for the host unit, and for communicating required settings for the host to be in an optimal status for fluid re-supply and to be prepared for electrically connecting the host unit with the mobile fluid supply system.

Figure 3:
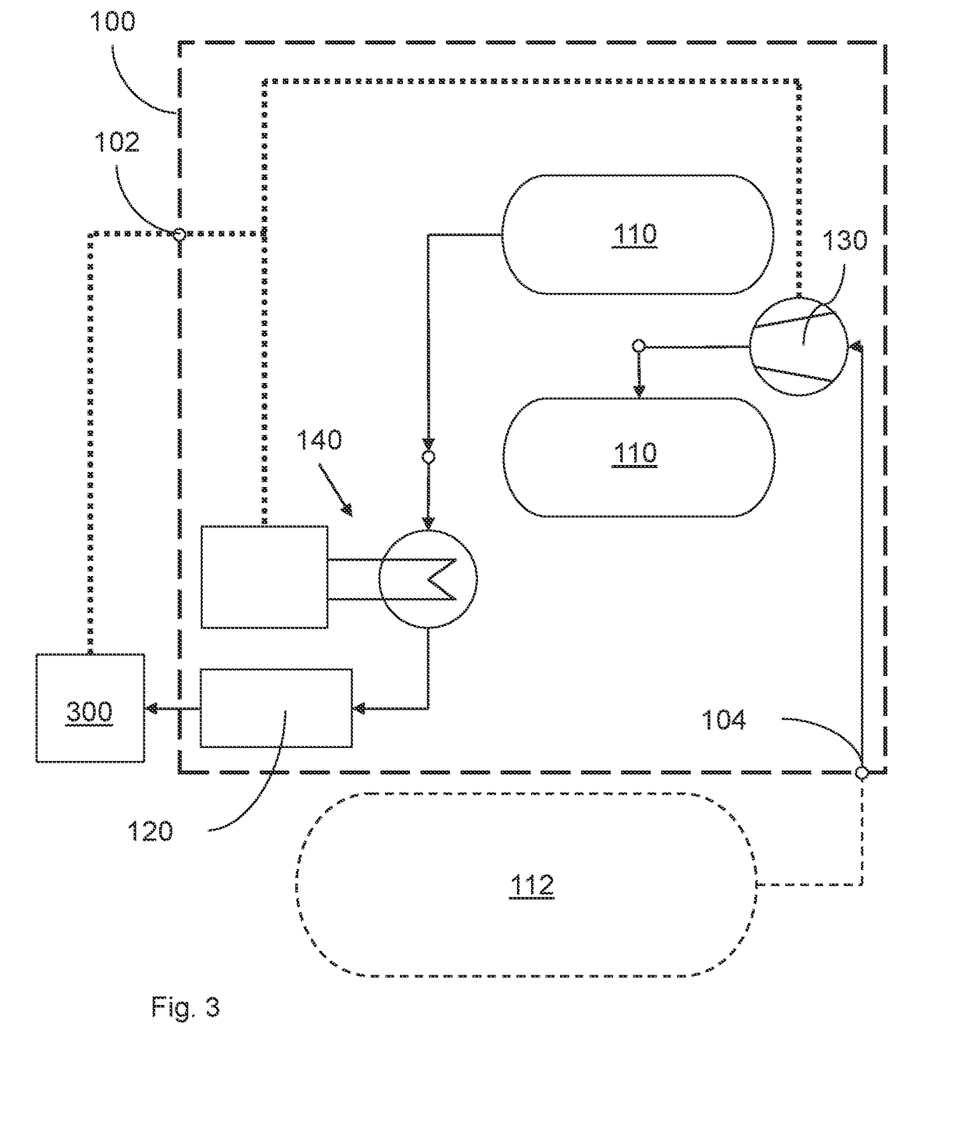

As shown in FIG. 3, the mobile fluid supply system may comprise at least two pressurized fluid volumes 110. The at least one compressor 130 may be arranged to alternatingly pressurize each one of the at least two pressurized fluid volumes 110. The at least two pressurized fluid volumes 110 may preferably be high-pressure fluid volumes.

Accordingly, when one pressurized fluid volume 110 is used in the fluid supply operation of a first host unit 300, the at least one compressor 130 may be arranged to pressurize the at least one other pressurized fluid volume 110 such that the at least one other pressurized fluid volume 110 is prepared for a subsequent fluid supply operation. This enables the mobile fluid supply system to be ready for supplying fluid to a further host unit 300 only a short time after suppling fluid to the first host unit 300. Thereby, a sequence of multiple fluid supply operations may be carried out more efficiently.

Figure 4:
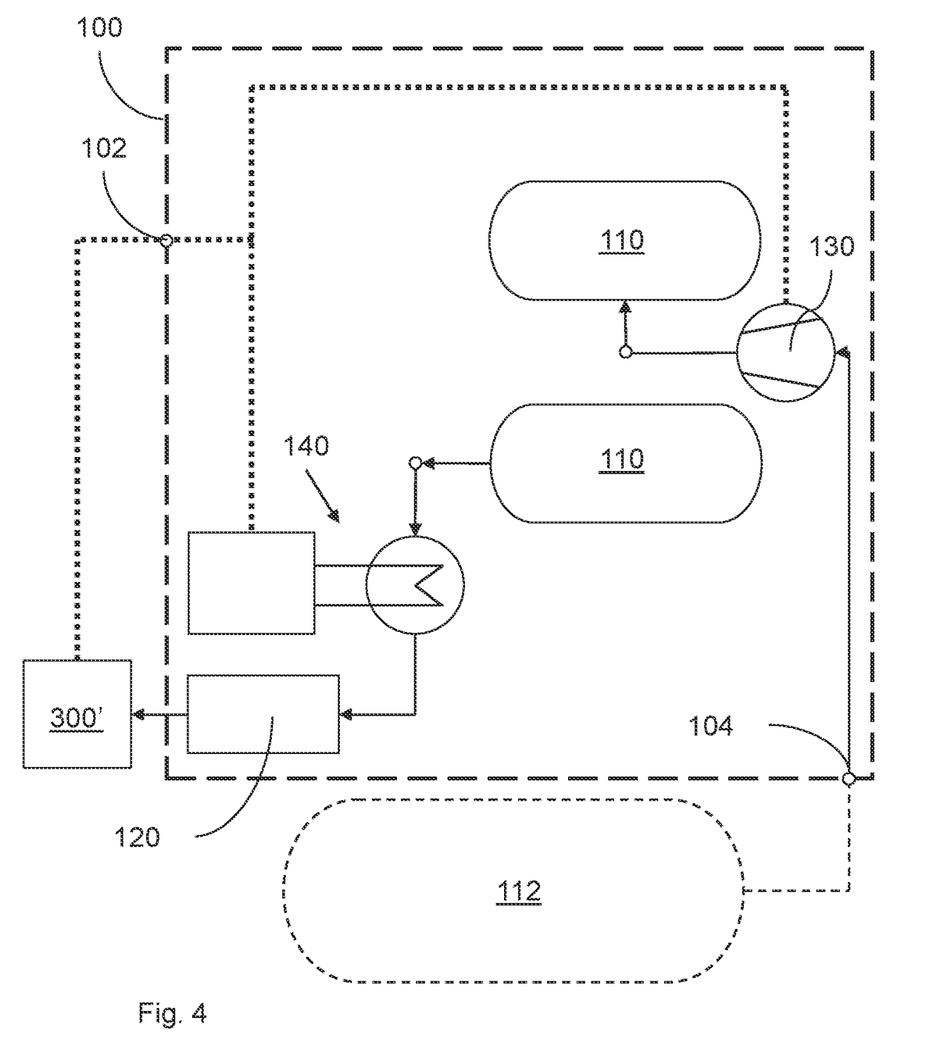

FIG. 4 exemplifies how the other pressurized fluid volume 110, which was previously not used in the fluid supply operation for host unit 300, is used in a subsequent fluid supply operation of a second host unit 300'.

As hinted to above, carrying high-pressure fluid volumes enables the mobile fluid supply system 100 to supply fluid to a limited number of host units 300 without requiring a much larger and cumbersome auxiliary pressurized fluid volume 112, such as a low-pressure fluid volume. In such a case, it may be possible to alternatingly pressurize the pressurized fluid volumes 110 using an inert gas. Alternatively, the pressurized fluid volumes 110 may each comprise a flexible compartment, e.g., a bladder or a movable wall, which would allow the pressurized fluid volumes 110 to be pressurized by the compressor 130 using air or some other available medium, instead of the auxiliary pressurized fluid volume 112.

Figure 5:
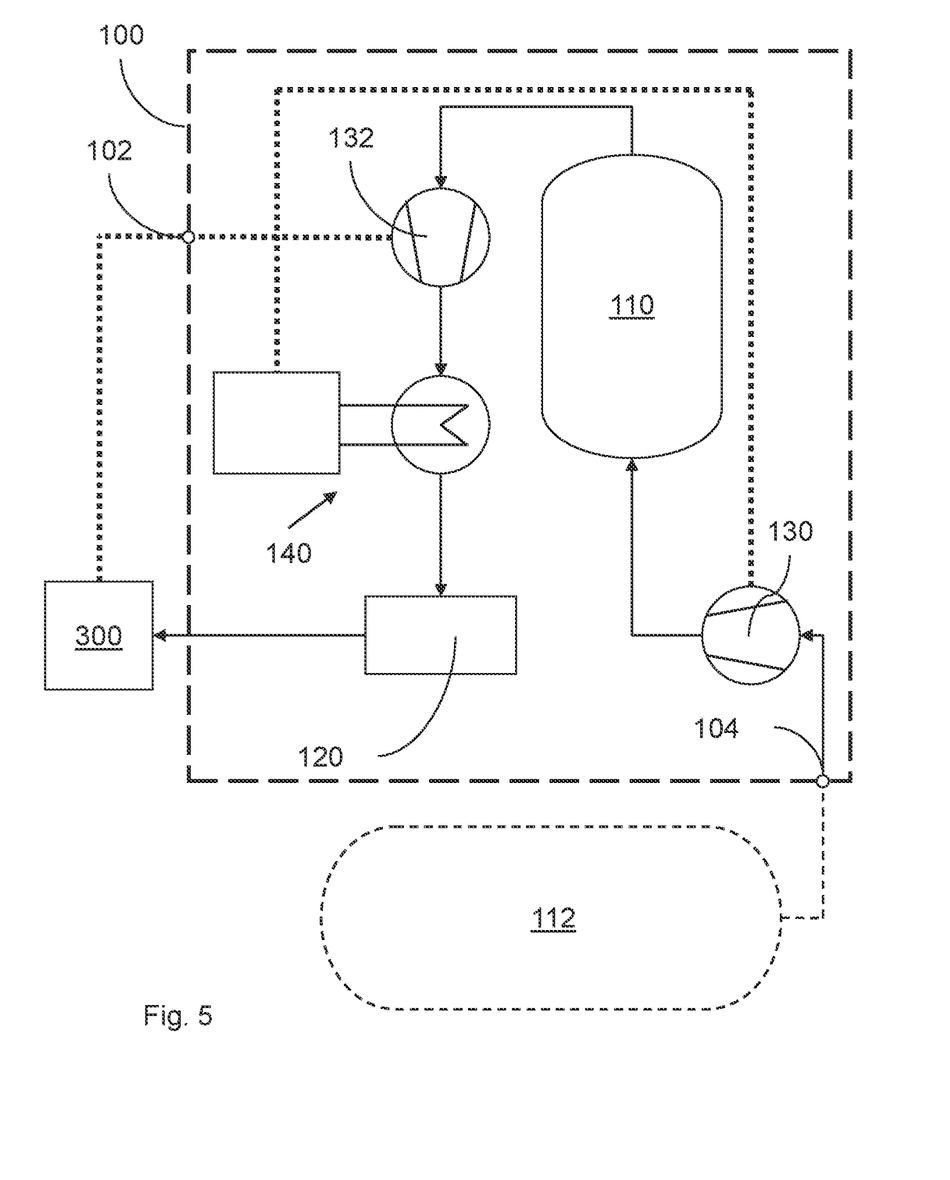

FIG. 5 shows a mobile fluid supply system 100 wherein the at least one pressurized fluid volume 110 is a medium-pressure fluid volume. The at least one compressor 130 may further comprise a booster compressor 132 fluidly coupled and arranged between the at least one medium-pressure fluid volume and the fluid dispenser 120.

In case of carrying at least one medium-pressure fluid volume, the booster compressor 132 is capable of pressurizing the fluid supplied from the medium-pressure fluid volume to a higher pressure to more efficiently carry out the fluid supply operation. As shown in FIG. 5, such a booster compressor 132 may also be electrically powered by the host unit 300.

The mobile fluid supply system may further comprise a compressor for pressurizing the at least one medium-pressure fluid volume if an auxiliary pressurized fluid volume 112 is available and fluidly connected, such as via the fluid connector 104.

The medium-pressure fluid volume may comprise a greater amount of fluid as compared to a high-pressure fluid volume but may still be comprised in the mobile fluid supply system without requiring auxiliary pressurized fluid volume 112, which could be carried on an additional trailer or an additional vehicle, making the mobile fluid supply system 100 more versatile for a limited fluid supply operation.

Figure 6:
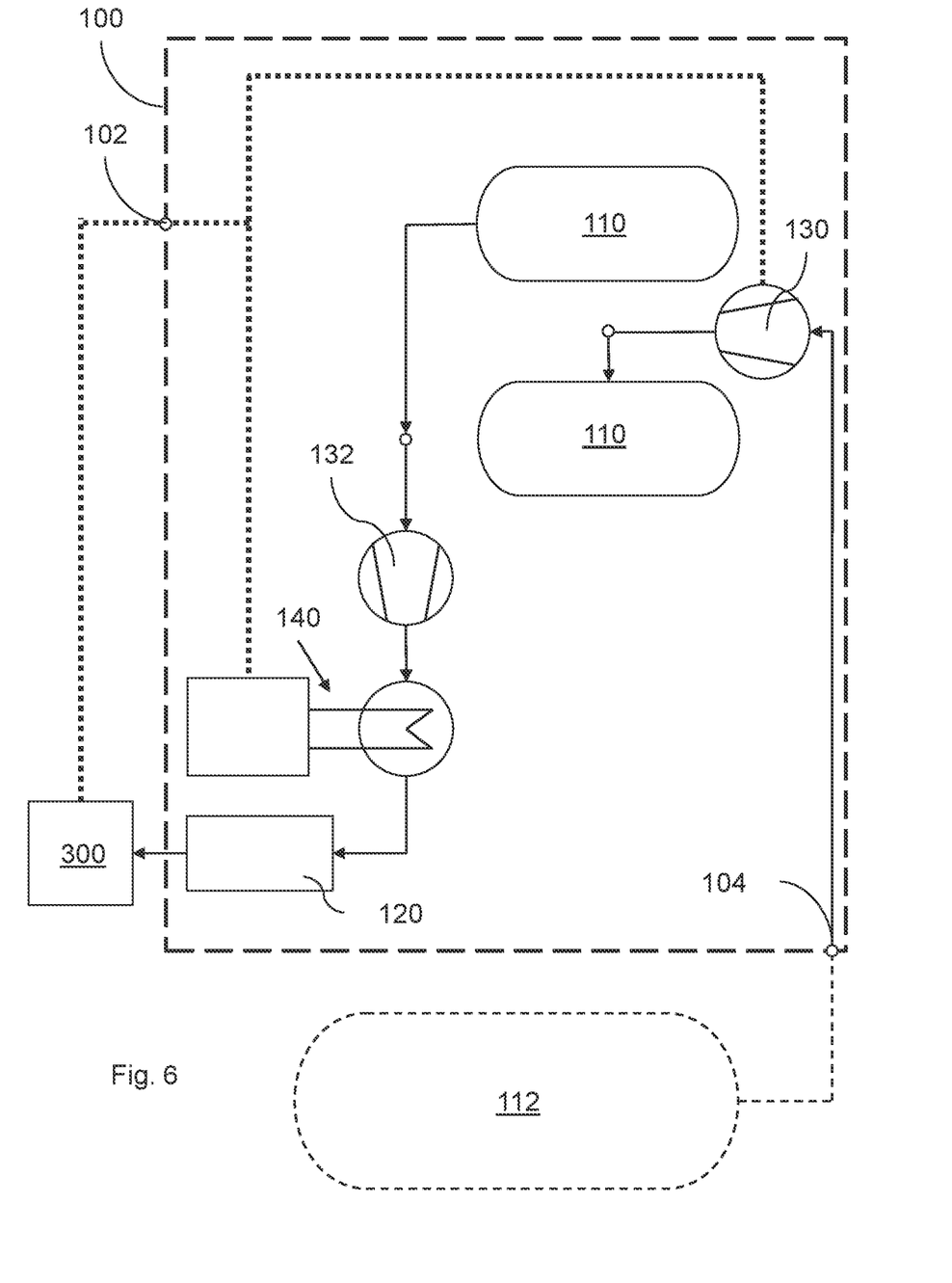
Figure 7:
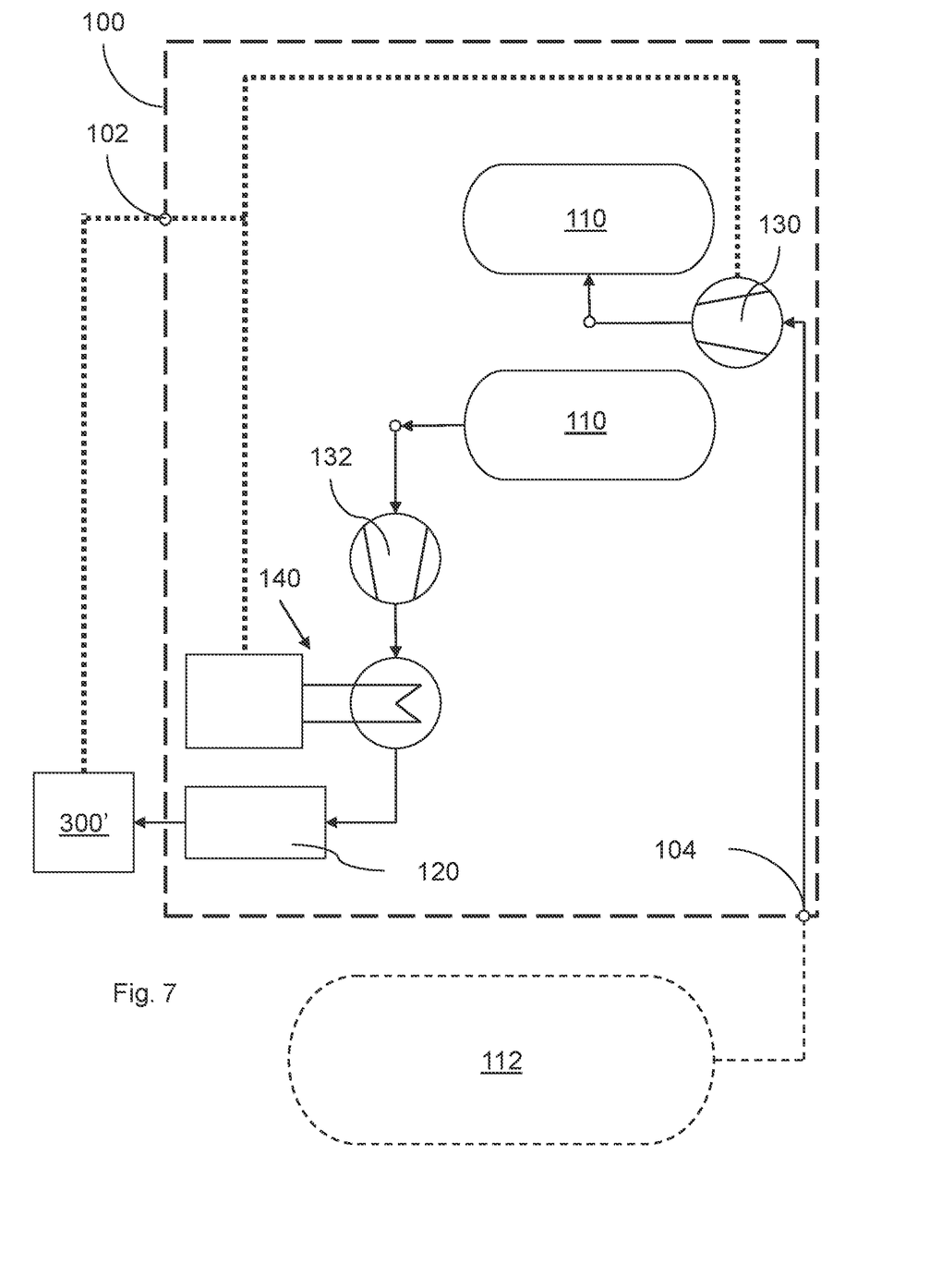

FIG. 6 and FIG. 7 show a configuration similar to FIGS. 3 and 4, where the mobile fluid supply system 100 comprises at least two pressurized fluid volumes 110. The at least one compressor 130 is arranged to alternatingly pressurize each one of the at least two pressurized fluid volumes 110. In FIGS. 6 and 7, the illustrated pressurized fluid volumes 110 are medium-pressure fluid volumes. Accordingly, a booster compressor 132 is fluidly coupled and arranged between the at least two medium-pressure fluid volumes and the fluid dispenser 120 to increase the pressure in the fluid supply operation. \

FIG. 6 shows how one medium-pressure fluid volume is used in the fluid supply operation of a first host unit 300. Subsequently, in FIG. 7, the other medium-pressure fluid volume is used in the fluid supply operation of a second host unit 300'.

The mobile fluid supply system 100 shown in FIGS. 1-7 may be a mobile hydrogen supply system, such as a mobile hydrogen refueling system (MHRS). The at least one pressurized fluid volume 110 may be at least one pressurized hydrogen volume.

As illustrated in FIGS. 3-7, the mobile fluid supply system 100 may further comprise an optional cooling device 140 arranged between the at least one pressurized fluid volume 110 and the fluid dispenser 120. The cooling device 140 may be configured to cool fluid being supplied in the fluid supply operation. The cooling device 140 may be electrically connected to the mobile fluid supply system 100 and configured to be electrically powered by the host unit 300 during the fluid supply operation.

The cooling device 140, such as a heat exchanger, is especially advantageous in case the fluid is hydrogen because hydrogen increases in temperature as it expands. A hydrogen storage volume in the host unit 300 often comprises heat-sensitive plastic parts, such as linings, which may be damaged by temperatures exceeding 85 degrees C. In order to efficiently supply fluid/hydrogen to the host unit 300, a cooling device 140 may be used to cool the fluid/hydrogen before it is dispensed into the storage volume of the host unit 300. Pre-compressed hydrogen may for instance be cooled to −45 degrees C. by a heat exchanger before dispensing to the host unit 300. As an example, a host unit 300 supplied with hydrogen may, after the fluid supply operation, have a filled 700-bar (70 MPa) storage volume at 70 degrees C. Without the cooling device, the fluid supply operation could still be carried out, but at a slower rate to avoid reaching damaging temperatures.

The control unit 500 may monitor the temperature of the dispensed fluid and control the cooling device 140 to adjust the temperature in a suitable manner.

Figure 8:
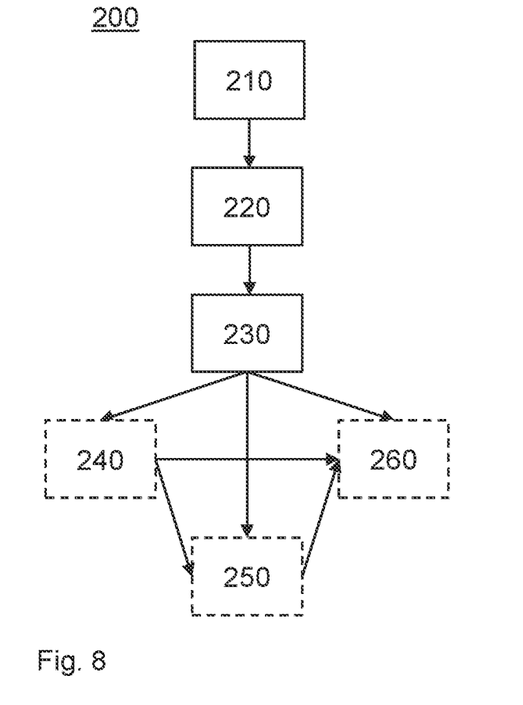
FIG. 8 shows a flowchart of a method for supplying fluid to a host unit according to the present disclosure.

FIG. 8 shows a flowchart of a method 200 for supplying fluid to a host unit 300 according to the present disclosure. The method comprises a first step 210 of fluidly connecting the fluid dispenser 120 to the host unit 300, a second step 220 of electrically connecting the mobile fluid supply system 100 to the host unit 300, and in a fluid supply operation, a third step 230 of supplying fluid to the host unit 300 from the at least one pressurized fluid volume 110 via the fluid dispenser 120. The fluid supply operation is electrically powered by the host unit 300.

As hinted to above, the fluid supply operation may be carried out without the use of a compressor 130 if the pressure of the at least one pressurized fluid volume 110 is higher than a pressure in a storage volume of the host unit 300. However, in order to carry out an efficient fluid supply operation, the compressor 130 is preferably used and is electrically powered by the host unit 300.

The fluid supply operation may optionally comprise supplying fluid to the host unit 300 from one of the at least two pressurized fluid volumes 110, and simultaneously pressurizing 240 the at least one other pressurized fluid volumes 110 using the at least one compressor 130.

As described above, a sequence of fluid supply operations may be made more efficient if at least two pressurized fluid volumes 110 are comprised in the mobile fluid supply system 100, where the method comprises an optional step 240 of pressurizing the at least one fluid volume 110 not being used to supply fluid in the fluid supply operation. The mobile fluid supply system 100 is thereby ready for supplying fluid to a second host unit 300' only a short time after supplying fluid to the first host unit. The at least two pressurized fluid volume 110 may preferably comprise at least one, such as at least two high-pressure fluid volumes. However, the at least two pressurized fluid volume 110 may alternatively comprise at least one medium-pressure fluid volume, such as at least two medium-pressure fluid volumes, or at least one high-pressure fluid volume and at least one medium-pressure fluid volume.

When at least one pressurized fluid volume 110 is a medium-pressure fluid volume, the fluid supply operation may comprise a step 250 of pressurizing fluid being supplied from the at least one medium-pressure fluid volume to the fluid dispenser using the booster compressor 132.

When the mobile fluid supply system comprises a cooling device 140, the fluid supply operation may further comprise a step 260 of cooling the fluid supplied from the at least one pressurized fluid volume 110.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An electrically powered mobile fluid supply system for supplying fluid to a host unit, the mobile fluid supply system comprising:
   at least one pressurized fluid volume,
   a fluid dispenser fluidly connectable to the host unit and to supply fluid from the at least one pressurized fluid volume to the host unit in a fluid supply operation, and
   at least one compressor to build sufficient pressure for the fluid supply operation in the mobile fluid supply system,
   wherein the mobile fluid supply system is electrically connected to the host unit and wherein the at least one compressor is electrically connected to the mobile fluid supply system and electrically powered by the host unit during the fluid supply operation,
   wherein the host unit includes a vehicle, a vessel, or a craft.

2. The mobile fluid supply system according to claim 1, wherein the at least one pressurized fluid volume comprises at least two pressurized fluid volumes, and wherein the at least one compressor is arranged to alternatingly pressurize each one of the at least two pressurized fluid volumes.

3. The mobile fluid supply system according to claim 2, wherein the at least two pressurized fluid volumes are high-pressure fluid volumes.

4. The mobile fluid supply system according to claim 1, wherein the at least one pressurized fluid volume is a medium-pressure fluid volume and wherein the at least one compressor further comprises a booster compressor fluidly coupled and arranged between the at least one medium-pressure fluid volume and the fluid dispenser.

5. The mobile fluid supply system according to claim 1, further comprising a cooling device, which is arranged between the at least one pressurized fluid volume and the fluid dispenser, to cool fluid being supplied in the fluid supply operation, and wherein the cooling device is electrically connected to the mobile fluid supply system and electrically powered by the host unit during the fluid supply operation.

6. The mobile fluid supply system according to claim 1, wherein the mobile fluid supply system is a mobile hydrogen supply system and wherein the at least one pressurized fluid volume is at least one pressurized hydrogen volume.

7. A method for supplying fluid to a host unit from a mobile fluid supply system according to claim 1, the method comprising:
   fluidly connecting the fluid dispenser to the host unit,
   electrically connecting the mobile fluid supply system to the host unit,
   in a fluid supply operation, supplying fluid to the host unit from the at least one pressurized fluid volume via the fluid dispenser, wherein the fluid supply operation is electrically powered by the host unit.

8. The method according to claim 7, wherein the at least one pressurized fluid volume comprises at least two pressurized fluid volumes, wherein the fluid supply operation comprises supplying fluid to the host unit from one of the at least two pressurized fluid volumes, and simultaneously pressurizing the at least one other pressurized fluid volumes using the at least one compressor.

9. The method according to claim 7, wherein the at least one pressurized fluid volume is at least one medium-pressure fluid volume and wherein the at least one compressor further comprises a booster compressor fluidly coupled and arranged between the at least one medium-pressure fluid volume and the fluid dispenser, wherein the fluid supply operation comprises pressurizing fluid being supplied from the at least one medium-pressure fluid volume to the fluid dispenser using the booster compressor.

10. The method according to claim 7, wherein the fluid supply operation further comprises cooling the fluid supplied from the at least one pressurized fluid volume.

11. A control unit configured to control the fluid supply operation according to the method of claim 7.

12. A computer readable non-transitory medium having stored thereon a computer program comprising program code to cause the control unit of claim 11 to execute the step of the fluid supply operation of claim 7.

13. A vehicle, vessel or craft comprising the mobile fluid supply system according to claim 1.

* * * * *